(12) United States Patent  
Sharma (10) Patent No.: US 9,208,755 B2
(45) Date of Patent: Dec. 8, 2015

(54) LOW POWER APPLICATION EXECUTION ON A DATA PROCESSING DEVICE HAVING LOW GRAPHICS ENGINE UTILIZATION

(71) Applicant: NVIDIA Corporation, Santa Clara, CA (US)

(72) Inventor: Mitesh Sharma, Rajasthan (IN)

(73) Assignee: NVIDIA Corporation, Santa Clara, CA (US)

( * ) Notice: Subject to any disclaimer, the term of this patent is extended or adjusted under 35 U.S.C. 154(b) by 93 days.

(21) Appl. No.: 13/691,866

(22) Filed: Dec. 3, 2012

(65) Prior Publication Data

US 2014/0152678 A1 Jun. 5, 2014

(51) Int. Cl.
*G09G 5/36* (2006.01)
*G06F 3/14* (2006.01)
*G09G 5/395* (2006.01)

(52) U.S. Cl.
CPC ........ *G09G 5/363* (2013.01); *G06F 3/14* (2013.01); *G09G 5/395* (2013.01); *G09G 2330/021* (2013.01); *G09G 2330/022* (2013.01)

(58) Field of Classification Search
CPC .............. G09G 5/363; G09G 2360/12; G09G 2330/02; G09G 2330/021; G09G 2330/022
USPC ................................. 345/501, 530
See application file for complete search history.

(56) References Cited

U.S. PATENT DOCUMENTS

| | | | |
|---|---|---|---|
| 7,167,994 B2 | 1/2007 | Zdravkovic | |
| 7,343,508 B2 | 3/2008 | Khodorkovsky | |
| 7,730,336 B2 | 6/2010 | Marinkovic et al. | |
| 7,800,621 B2 * | 9/2010 | Fry | 345/531 |
| 7,991,939 B1 | 8/2011 | Tsu et al. | |
| 8,041,848 B2 * | 10/2011 | Conroy et al. | 710/22 |
| 8,274,501 B2 | 9/2012 | Kwa et al. | |
| 8,892,844 B2 | 11/2014 | Walker | |
| 8,963,863 B2 | 2/2015 | Ke et al. | |
| 2002/0163523 A1 | 11/2002 | Adachi et al. | |
| 2005/0212806 A1 | 9/2005 | Koselj et al. | |

(Continued)

FOREIGN PATENT DOCUMENTS

CN  102193765 A   9/2011
TW  201243606 A   11/2012

OTHER PUBLICATIONS

Examination Report from German Application No. 10 2013 109 250.0, dated Aug. 27, 2014.

*Primary Examiner* — Joni Richer
(74) *Attorney, Agent, or Firm* — Zilka-Kotab, PC (57) ABSTRACT

A method includes determining, through test instructions executing on a processor of a data processing device, utilization of a graphics engine of the processor by an application executing thereon based on initiation thereof through a driver associated with the processor and/or an operating system executing on the data processing device, and detecting, through the test instructions, an idle state of one or more non-graphics engine(s) of the processor. The method also includes transitioning, through the processor, a frame buffer associated therewith into a self-refresh mode of low power utilization thereof, and copying data related to the execution of the application to a memory of the data processing device. Further, the method includes clock-gating the one or more non-graphics engine(s) to reduce a power consumption of the data processing device, and enabling the graphics engine to utilize the copied data in the memory for continued execution of the application.

17 Claims, 5 Drawing Sheets

(56) References Cited

U.S. PATENT DOCUMENTS

| | | | |
|---|---|---|---|
| 2011/0157191 A1* | 6/2011 | Huang et al. | 345/503 |
| 2012/0206461 A1 | 8/2012 | Wyatt et al. | |
| 2012/0233413 A1 | 9/2012 | Walker | |
| 2013/0002596 A1* | 1/2013 | Ke et al. | 345/173 |
| 2013/0016114 A1* | 1/2013 | Rabii | 345/589 |

* cited by examiner

LOW POWER APPLICATION EXECUTION ON A DATA PROCESSING DEVICE HAVING LOW GRAPHICS ENGINE UTILIZATION

FIELD OF TECHNOLOGY

This disclosure relates generally to data processing devices and, more particularly, to low power application execution on a data processing device having low graphics engine utilization.

BACKGROUND

A data processing device (e.g., a laptop computer, a desktop computer, a workstation, a notebook, a netbook, a mobile device) may be configured to execute a graphics engine and a number of non-graphics engines on a processor thereof. The aforementioned data processing device may be executing an application when one or more of the non-graphics engines is in an idle state and the graphics engine is in a state of low utilization thereof. The non-graphics engines may contribute to power consumption of the data processing device despite being in an idle state of minimal utilization. The aforementioned power consumption may contribute to inefficient use of the data processing device.

SUMMARY

Disclosed are a method, a device and/or a system of low power application execution on a data processing device having low graphics engine utilization.

In one aspect, a method includes determining, through test instructions executing on a processor of a data processing device, utilization of a graphics engine of the processor by an application executing on the data processing device based on initiation thereof through a driver associated with the processor and/or an operating system executing on the data processing device, and detecting, through the test instructions executing on the processor, an idle state of one or more non-graphics engine(s) of the processor. The method also includes transitioning, through the processor, a frame buffer associated therewith into a self-refresh mode of low power utilization thereof following determination of utilization of the graphics engine below a threshold and detection of the idle state of the one or more non-graphics engine(s), and copying data related to the execution of the application to a memory of the data processing device in conjunction with the transitioning of the frame buffer into the self-refresh mode.

Further, the method includes clock-gating the one or more non-graphics engine(s) following the transitioning of the frame buffer into the self-refresh mode and copying the data related to the execution of the application to the memory to reduce a power consumption of the data processing device, and enabling the graphics engine to utilize the copied data in the memory for continued execution of the application on the data processing device.

The method may include monitoring, through the test instructions executing on the processor, the utilization of the graphics engine and the one or more non-graphics engine(s) based on utilization of the frame buffer. The method may also involve monitoring, through the test instructions executing on the processor, the utilization of the graphics engine and the one or more non-graphics engine(s) based on a clock speed thereof and/or a parameter of a bus to which the processor is coupled to. The parameter may be a speed of the bus and/or a power state of the bus. The method may further include rendering, through the processor, data on a display unit of the data processing device based on the utilization of the copied data in the memory.

When the utilization of the graphics engine exceeds the threshold, the method may include transitioning, through the processor, the frame buffer back into an active mode thereof, copying the data from the memory back into the frame buffer following the transitioning of the frame buffer back into the active mode and/or turning on, through the processor, the clock-gated one or more non-graphics engine(s) following detection of activity therein based on another threshold. The processor may be a Graphics Processing Unit (GPU) or a Central Processing Unit (CPU) and/or the memory may be a system memory, a cache memory or a local memory associated with the processor.

In another aspect, a non-transitory medium, readable through a data processing device and including instructions embodied therein that are executable through the data processing device, is disclosed. The non-transitory medium include instructions to determine, through a processor of the data processing device, utilization of a graphics engine of the processor by an application executing on the data processing device based on initiation thereof through a driver associated with the processor and/or an operating system executing on the data processing device, and instructions to detect, through the processor, an idle state of one or more non-graphics(s) engine of the processor. The non-transitory medium also includes instructions to transition, through the processor, a frame buffer associated therewith into a self-refresh mode of low power utilization thereof following determination of utilization of the graphics engine below a threshold and detection of the idle state of the one or more non-graphics engine(s), and instructions to copy data related to the execution of the application to a memory of the data processing device in conjunction with the transitioning of the frame buffer into the self-refresh mode.

Further, the non-transitory medium includes instructions to clock-gate the one or more non-graphics engine(s) following the transitioning of the frame buffer into the self-refresh mode and copying the data related to the execution of the application to the memory to reduce a power consumption of the data processing device, and instructions to enable the graphics engine to utilize the copied data in the memory for continued execution of the application on the data processing device. The non-transitory medium may also include instructions to perform supplementary operations discussed above.

In yet another aspect, a data processing device includes a memory, a processor communicatively coupled to the memory, and a driver component associated with the processor and/or an operating system executing on the data processing device. The driver component is configured to enable determining utilization of a graphics engine of the processor by an application executing on the data processing device through test instructions executing on the processor, detecting, through the test instructions executing on the processor, an idle state of one or more non-graphics(s) engine of the processor, and transitioning, through the processor, a frame buffer associated therewith into a self-refresh mode of low power utilization thereof following determination of utilization of the graphics engine below a threshold and detection of the idle state of the one or more non-graphics engine(s).

The driver component is further configured to enable copying data related to the execution of the application to the memory in conjunction with the transitioning of the frame buffer into the self-refresh mode, clock-gating the one or more non-graphics engine(s) following the transitioning of the frame buffer into the self-refresh mode and copying the data related to the execution of the application to the memory to reduce a power consumption of the data processing device, and utilizing of the copied data in the memory by the graphics engine for continued execution of the application on the data processing device. The data processing device may also perform the supplementary operations discussed above.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of low power application execution on a data processing device having low graphics engine utilization. Although the present embodiments have been described with reference to specific example embodiments, it will be evident that various modifications and changes may be made to these embodiments without departing from the broader spirit and scope of the various embodiments.

Figure 1:
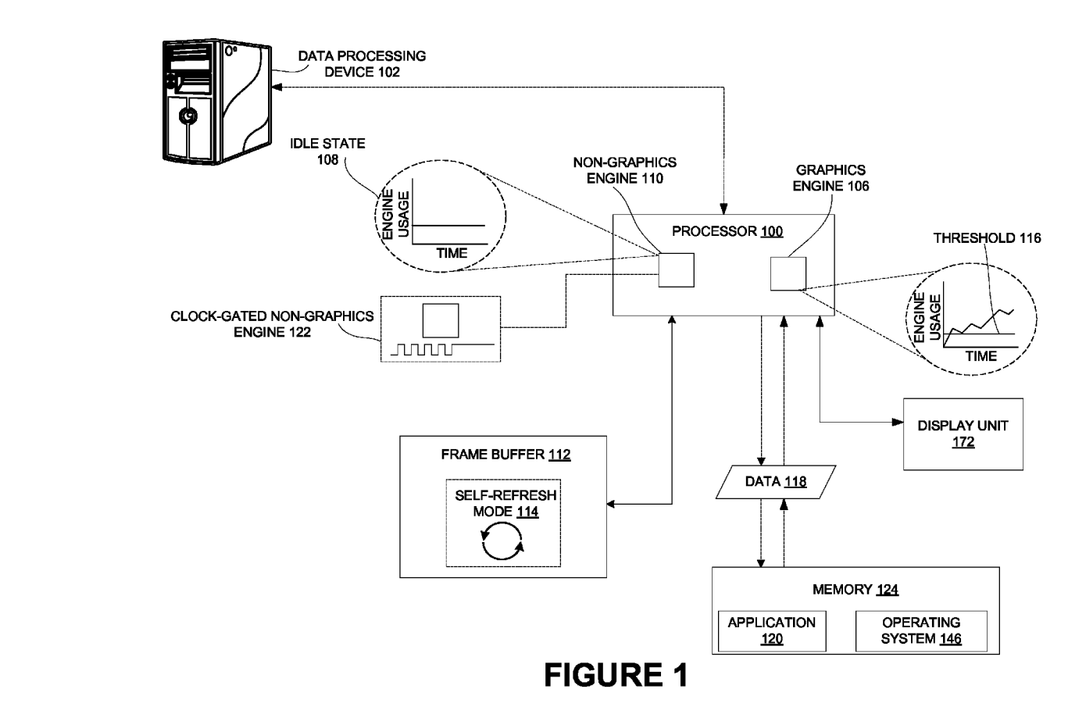
FIG. 1 is a schematic view of a data processing device executing a graphics engine and a non-graphics engine on a processor thereof, according to one embodiment.

FIG. 1 shows a data processing device 102 executing a non-graphics engine 110 and a graphics engine 106 on a processor 100 thereof, according to one or more embodiments. In one or more embodiments, data processing device 102 may include a memory 124 communicatively coupled to processor 100. In one or more embodiments, data processing device 102 may be a desktop computer, a laptop computer, a netbook, a notebook, a Personal Digital Assistant (PDA) or a mobile device such as a mobile phone. Other examples of data processing device 102 are within the scope of the exemplary embodiments. In one or more embodiments, an application 120 may execute on data processing device 102; FIG. 1 shows application 120 (e.g., an application program) being stored in memory 124 to be executed on data processing device 102.

In one or more embodiments, processor 100 may be a Central Processing Unit (CPU) or a Graphics Processing Unit (GPU); memory 124 may be a volatile-memory and/or a non-volatile memory. Examples of memory 124 may include but is not limited to a system memory, a cache memory and a local memory associated with processor 100. In one or more embodiments, processor 100 may execute test instructions 104 to determine utilization of graphics engine 106 by application 120. In one or more embodiments, the aforementioned determination may be initiated through a driver component (a software driver; not shown in FIG. 1); the driver component may be associated with processor 100 (e.g., GPU) and/or with an operating system 146 executing on data processing device 102; operating system 146 is shown as being part of memory 124 in FIG. 1. In one or more embodiments, based on execution of test instructions 104 on processor 100, an idle state 108 of non-graphics engine 110 may also be detected. It is obvious that graphics engine 106 and non-graphics engine 110 (e.g., engine unrelated to graphics processing through data processing device 102) may refer to modules executing on processor 100. In one or more embodiments, as shown in FIG. 1, processor 100 may also have a frame buffer 112 associated therewith. In one or more embodiments, frame buffer 112 may include data (e.g., color values) associated with information to be displayed on a display unit 172 of data processing device 102.

FIG. 1 shows frame buffer 112 separate from memory 124; it is, however, obvious that frame buffer 112 may be part of memory 124. In one or more embodiments, frame buffer 112 may be in an active mode of operation thereof. However, in one or more embodiments, upon determining that graphics engine 106 is being utilized below a threshold 116 and detecting idle state 108 of non-graphics engine 110, processor 100 may be configured to transition frame buffer 112 into a self-refresh mode 114 (e.g., an analogous standby mode) of low power utilization thereof. In one or more embodiments, in conjunction with the transitioning of frame buffer 112 into self-refresh mode 114, data (e.g., data 118) related to execution of application 120 on data processing device 102 may be copied into memory 124. In one or more embodiments, non-graphics engine 110 may then be clock-gated (e.g., see clock-gated non-graphics engine 122; clock-gating may involve disabling circuitry and/or pipelines of processor 100) following the transitioning of frame buffer 112 into self-refresh mode 114 and the copying of data 118 into memory 124.

Figure 2:
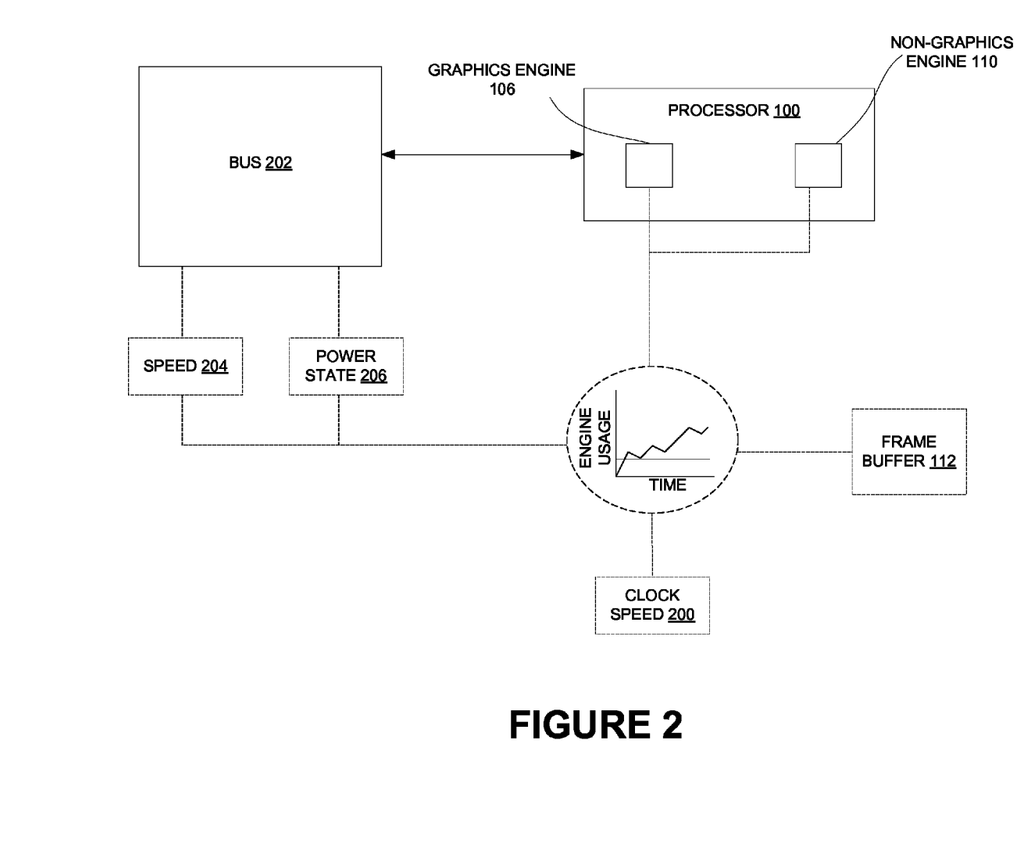
FIG. 2 is a schematic view of monitoring utilization of the graphics engine and the non-graphics engine executing on the processor of the data processing device of FIG. 1, according to one embodiment.

In one or more embodiments, the abovementioned clock-gating may reduce power consumption during execution of application 120 on data processing device 102. In one or more embodiments, for the continued execution of application 120, graphics engine 106 may utilize the copied data 118 in memory 124. In one or more embodiments, test instructions 104 may be executed on processor 100 to monitor utilization of graphics engine 106 and non-graphics engine 110 based on utilization of frame buffer 112, as shown in FIG. 2. FIG. 2 also shows monitoring of utilization of graphics engine 106 and non-graphics engine 110 based on clock speed 200 thereof, a speed 204 of a bus 202 (e.g., system bus) to which processor 100 is coupled to and/or a power state 206 of bus 202. Other bus 202 parameters being utilized to monitor utilization are within the scope of the exemplary embodiments discussed herein.

In one or more embodiments, idle state 108 of non-graphics engine 110 may be a state of constant low activity or inactivity therein. It is obvious that processor 100 may execute more than one non-graphics engine 110; further, it is obvious that not all of the non-graphics engines need to be clock-gated, as discussed above. Clock-gating may be performed as per system requirements when there are a number of non-graphics engines executing on processor 100.

Figure 3:
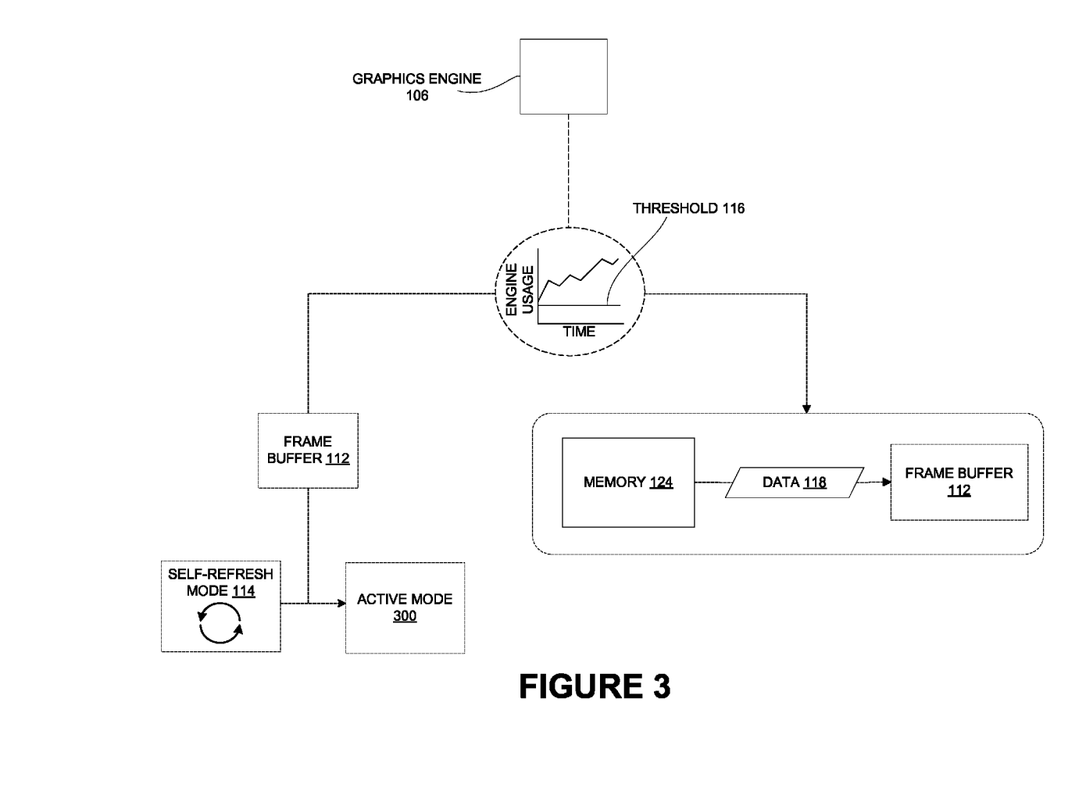
FIG. 3 is a schematic view of transitioning of a frame buffer of the data processing device of FIG. 1 back into an active mode thereof, according to one embodiment.

In one or more embodiments, data may be rendered on display unit 172 through processor 100 based on utilization of the copied data 118 in memory 124. FIG. 3 shows transitioning of frame buffer 112 back into the active mode (e.g., active mode 300) thereof. In one or more embodiments, when utilization of graphics engine 106 exceeds threshold 116, processor 100 may be configured to transition frame buffer 112 back into active mode 300. In one or more embodiments, following the transitioning, data 118 may be copied from memory 124 back into frame buffer 112 to resume regular operation thereof. In one or more embodiments, one or more clock-gated non-graphics engine(s) 110 may then be turned on through processor 100 following detection of activity therein based on another threshold (not shown). It is obvious that the turning on of the one or more clock-gated non-graphics engine(s) 110 may be as per system requirements or requirements of a user of data processing device 102.

Figure 4:
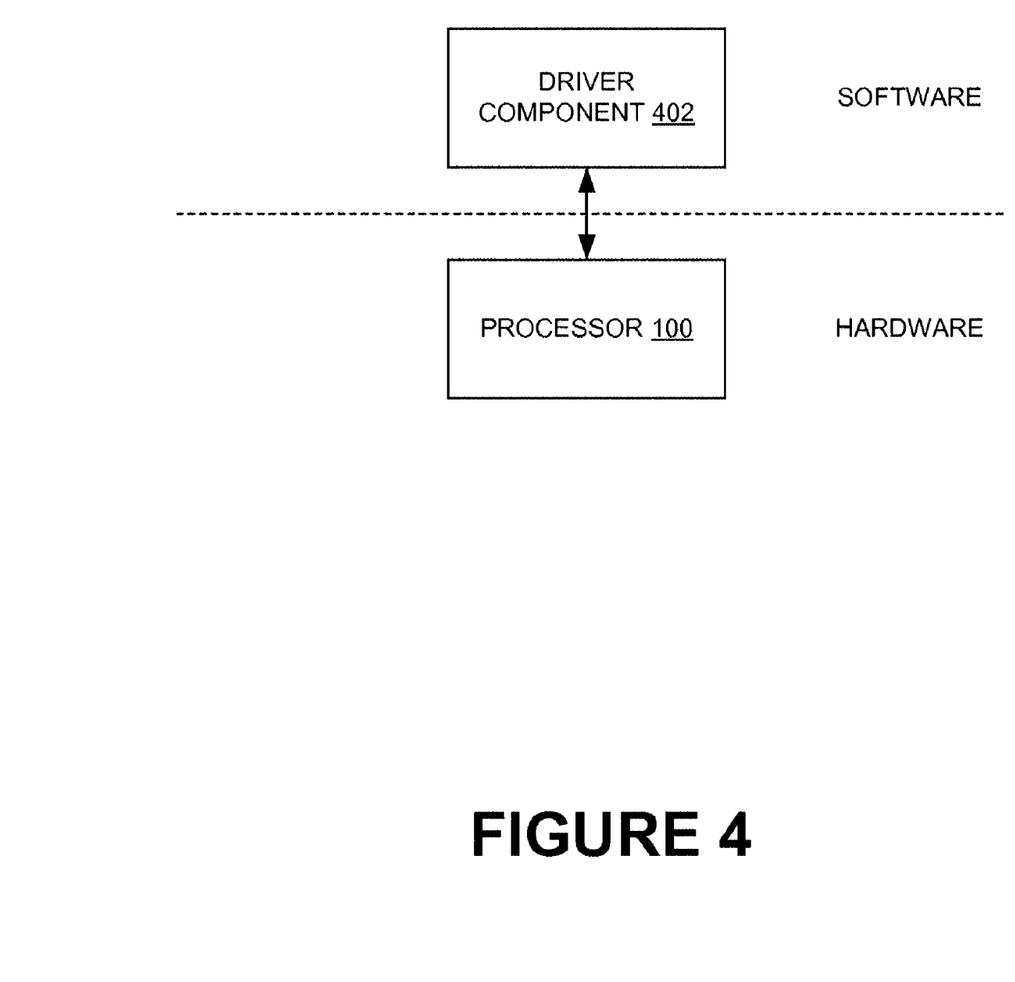
FIG. 4 is a schematic view of interaction between a driver component and the processor of the data processing device of FIG. 1 during execution of an application thereon, according to one embodiment.

FIG. 4 shows interaction between a driver component (e.g., driver component 402) discussed above and processor 100 during execution of application 120 on data processing device 102. In one or more embodiments, driver component 402 may initiate processor 100 to determine utilization of graphics engine 106 and detect idle state 108 of non-graphics engine 110 automatically based on user intervention on data processing device 102 (e.g., through clicking a button on a user interface, a physical button on data processing device 102), execution of application 120, execution of another application unrelated to application 120 and/or loading of operating system 146. Other forms of initiation are within the scope of the exemplary embodiments discussed herein.

The driver component (e.g., driver component 402) or equivalent software thereof discussed above may be stored in memory 124 to be installed on data processing device 102 after a download through the Internet. Alternately, an external memory may be utilized therefore. Also, instructions associated with the driver component may be embodied on a non-transitory medium readable through data processing device 102 such as a Compact Disc (CD), a Digital Video Disc (DVD), a Blu-Ray™ disc, a floppy disk, or a diskette etc. The aforementioned instructions may be executable through data processing device 102.

The set of instructions associated with the driver component or equivalent software thereof is not limited to specific embodiments discussed above, and may, for example, be implemented in operating system 146, an application program (e.g., application 120), a foreground or a background process, a network stack or any combination thereof. Other variations are within the scope of the exemplary embodiments discussed herein.

Figure 5:
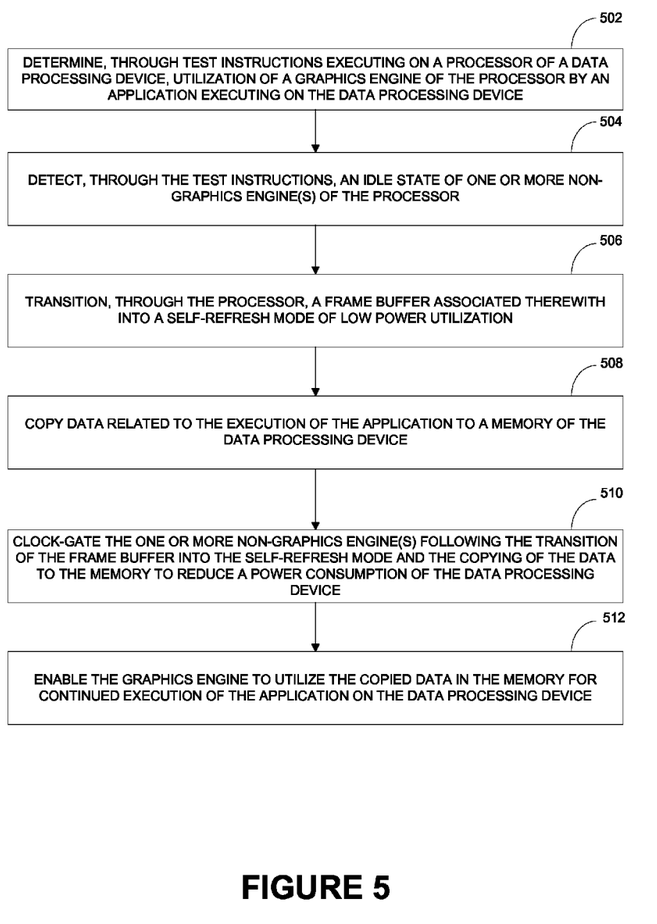
FIG. 5 is a process flow diagram detailing the operations involved in low power application execution on the data processing device of FIG. 1 having low graphics engine utilization, according to one or more embodiments.

FIG. 5 shows a process flow diagram detailing the operations involved in low power application 120 execution on data processing device 102 having low graphics engine 106 utilization, according to one or more embodiments. In one or more embodiments, operation 502 may involve determining, through test instructions 104 executing on processor 100, utilization of graphics engine 106 by application 120 based on initiation thereof through a driver (e.g., driver component 402) associated with processor 100 and/or operating system 146. In one or more embodiments, operation 504 may involve detecting, through test instructions 104, idle state 108 of one or more non-graphics engine(s) (e.g., non-graphics engine 110) of processor 100.

In one or more embodiments, operation 506 may involve transitioning, through processor 100, frame buffer 112 associated therewith into self-refresh mode 114 of low power utilization thereof following determination of utilization of graphics engine 106 below threshold 116 and detection of idle state 108 of the one or more non-graphics engine(s). In one or more embodiments, operation 508 may involve copying data 118 related to the execution of application 120 to memory 124 in conjunction with the transitioning of frame buffer 112 into self-refresh mode 114. In one or more embodiments, operation 510 may involve clock-gating the one or more non-graphics engine(s) following the transitioning of frame buffer 112 into self-refresh mode 114 and copying data 118 related to the execution of application 120 into memory 124 to reduce a power consumption of data processing device 102. In one or more embodiments, operation 512 may then involve enabling graphics engine 106 to utilize the copied data 118 in memory 124 for continued execution of application 120 on data processing device 102.

An example scenario involving concepts associated with the exemplary embodiments discussed herein will now be described. A workstation (an example data processing device 102) user may wish to reduce power consumption during the execution of application 120 thereon when there is low utilization of graphics engine 106 and when non-graphics engine 110 is in an idle state 108. Non-graphics engine 110 in idle state 108 may consume power, despite reduced utilization thereof. Therefore, the user may wish to eliminate the aforementioned power inefficiency through executing test instructions 104 on processor 100 of workstation to detect utilization of graphics engine 106 and idle state 108 of non-graphics engine 110. The aforementioned detection may be enabled through driver component 402. Based on the detection, power consumption through the workstation may be reduced as discussed above.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 102), and may be performed in any order (e.g., including using means for achieving the various operations).

Accordingly, the specification and drawings are to be regarded in an illustrative rather than a restrictive sense.

What is claimed is:

1. A method, comprising:
 determining, through test instructions executing on a processor of a data processing device, utilization of a graphics engine of the processor by an application executing on the data processing device based on initiation thereof through a driver associated with at least one of the processor and an operating system executing on the data processing device;

detecting, through the test instructions executing on the processor, an idle state of at least one non-graphics engine of the processor;

transitioning, through the processor, a frame buffer associated therewith into a self-refresh mode of low power utilization thereof following determination of utilization of the graphics engine below a threshold and detection of the idle state of the at least one non-graphics engine;

copying data related to the execution of the application to a memory of the data processing device in conjunction with the transitioning of the frame buffer into the self-refresh mode;

clock-gating the at least one non-graphics engine following the transitioning of the frame buffer into the self-refresh mode and copying the data related to the execution of the application to the memory to reduce a power consumption of the data processing device; and enabling the graphics engine to utilize the copied data in the memory for continued execution of the application on the data processing device;

wherein when the utilization of the graphics engine exceeds the threshold, the method further comprises:
transitioning, through the processor, the frame buffer back into an active mode thereof; and
copying the data from the memory back into the frame buffer following the transitioning of the frame buffer back into the active mode.

2. The method of claim 1, further comprising:
monitoring, through the test instructions executing on the processor, the utilization of the graphics engine and the at least one non-graphics engine based on utilization of the frame buffer.

3. The method of claim 1, further comprising:
monitoring, through the test instructions executing on the processor, the utilization of the graphics engine and the at least one non-graphics engine based on at least one of clock speed thereof and a parameter of a bus to which the processor is coupled to, the parameter being at least one of a speed of the bus and a power state of the bus.

4. The method of claim 1, further comprising rendering, through the processor, data on a display unit of the data processing device based on the utilization of the copied data in the memory.

5. The method of claim 1, further comprising:
turning on, through the processor, the clock-gated at least one non-graphics engine following detection of activity therein based on another threshold.

6. The method of claim 1, wherein at least one of:
the processor is one of a Graphics Processing Unit (GPU) and a Central Processing Unit (CPU), and
the memory is one of a system memory, a cache memory and a local memory associated with the processor.

7. A non-transitory medium, readable through a data processing device and including instructions embodied therein that are executable through the data processing device, comprising:
instructions to determine, through a processor of the data processing device, utilization of a graphics engine of the processor by an application executing on the data processing device based on initiation thereof through a driver associated with at least one of the processor and an operating system executing on the data processing device;
instructions to detect, through the processor, an idle state of at least one non-graphics engine of the processor;
instructions to transition, through the processor, a frame buffer associated therewith into a self-refresh mode of low power utilization thereof following determination of utilization of the graphics engine below a threshold and detection of the idle state of the at least one non-graphics engine;
instructions to copy data related to the execution of the application to a memory of the data processing device in conjunction with the transitioning of the frame buffer into the self-refresh mode;
instructions to clock-gate the at least one non-graphics engine following the transitioning of the frame buffer into the self-refresh mode and copying the data related to the execution of the application to the memory to reduce a power consumption of the data processing device; and
instructions to enable the graphics engine to utilize the copied data in the memory for continued execution of the application on the data processing device;
when the utilization of the graphics engine exceeds the threshold, the non-transitory medium further comprises:
instructions to transition, through the processor, the frame buffer back into an active mode thereof; and
instructions to copy the data from the memory back into the frame buffer following the transitioning of the frame buffer back into the active mode.

8. The non-transitory medium of claim 7, further comprising:
instructions to monitor, through the processor, the utilization of the graphics engine and the at least one non-graphics engine based on utilization of the frame buffer.

9. The non-transitory medium of claim 7, further comprising:
instructions to monitor, through the processor, the utilization of the graphics engine and the at least one non-graphics engine based on at least one of clock speed thereof and a parameter of a bus to which the processor is coupled to, the parameter being at least one of a speed of the bus and a power state of the bus.

10. The non-transitory medium of claim 7, further comprising instructions to render, through the processor, data on a display unit of the data processing device based on the utilization of the copied data in the memory.

11. The non-transitory medium of claim 7, further comprising:
instructions to turn on, through the processor, the clock-gated at least one non-graphics engine following detection of activity therein based on another threshold.

12. The non-transitory medium of claim 7, comprising:
instructions compatible with one of a GPU and a CPU as a processor, and
instructions compatible with one of a system memory, a cache memory and a local memory associated with the processor as the memory.

13. A data processing device, comprising:
a memory;
a processor communicatively coupled to the memory; and
a driver component associated with at least one of the processor and an operating system executing on the data processing device, the driver component being configured to enable:
determining utilization of a graphics engine of the processor by an application executing on the data processing device through test instructions executing on the processor,
detecting, through the test instructions executing on the processor, an idle state of at least one non-graphics engine of the processor,
transitioning, through the processor, a frame buffer associated therewith into a self-refresh mode of low power utilization thereof following determination of utilization of the graphics engine below a threshold and detection of the idle state of the at least one non-graphics engine, copying data related to the execution of the application to the memory in conjunction with the transitioning of the frame buffer into the self-refresh mode, clock-gating the at least one non-graphics engine following the transitioning of the frame buffer into the self-refresh mode and copying the data related to the execution of the application to the memory to reduce a power consumption of the data processing device, and utilizing of the copied data in the memory by the graphics engine for continued execution of the application on the data processing device;

wherein when the utilization of the graphics engine exceeds the threshold, the driver component is further configured to enable:

transitioning, through the processor, the frame buffer back into an active mode thereof, and copying the data from the memory back into the frame buffer following the transitioning of the frame buffer back into the active mode.

14. The data processing device of claim 13, wherein the test instructions executing on the processor enable monitoring of the utilization of the graphics engine and the at least one non-graphics engine based on utilization of the frame buffer.

15. The data processing device of claim 13, wherein the test instructions executing on the processor enable monitoring of the utilization of the graphics engine and the at least one non-graphics engine based on at least one of clock speed thereof and a parameter of a bus to which the processor is coupled to, the parameter being at least one of a speed of the bus and a power state of the bus.

16. The data processing device of claim 13, wherein the processor is configured to render data on a display unit associated with the data processing device based on the utilization of the copied data in the memory.

17. The data processing device of claim 13, wherein the driver component is further configured to enable:

turning on, through the processor, the clock-gated at least one non-graphics engine following detection of activity therein based on another threshold.

\* \* \* \* \*